United States Patent
Hummel et al.

(10) Patent No.: US 8,112,993 B2
(45) Date of Patent: Feb. 14, 2012

(54) ARRANGEMENT OF A CHARGE AIR COOLER IN AN INTAKE SYSTEM OF AN INTERNAL COMBUSTION ENGINE

(75) Inventors: Karl-Ernst Hummel, Bietigheim-Bissingen (DE); Bernhard Huurdeman, Freiberg (DE)

(73) Assignee: Mann + Hummel GmbH, Ludwigsburg (DE)

(*) Notice: Subject to any disclaimer, the term of this patent is extended or adjusted under 35 U.S.C. 154(b) by 851 days.

(21) Appl. No.: 12/028,014

(22) Filed: Feb. 8, 2008

(65) Prior Publication Data

US 2008/0223345 A1  Sep. 18, 2008

(30) Foreign Application Priority Data

Feb. 9, 2007  (DE) .................... 20 2007 002 169 U

(51) Int. Cl.
*F02B 29/04* (2006.01)
(52) U.S. Cl. .......................... 60/599; 165/145
(58) Field of Classification Search .............. 60/599; 123/563; 165/145, 176
See application file for complete search history.

(56) References Cited

U.S. PATENT DOCUMENTS

| | | | | |
|---|---|---|---|---|
| 2,595,457 A * | 5/1952 | Jensen et al. | .................. | 165/166 |
| 2,665,889 A * | 1/1954 | Huet | ............................ | 165/120 |
| 4,236,492 A * | 12/1980 | Tholen | ......................... | 123/563 |
| 4,562,697 A * | 1/1986 | Lawson | .......................... | 60/599 |
| 4,785,788 A * | 11/1988 | Targa Pascual | ................. | 60/599 |
| 6,189,604 B1 * | 2/2001 | Yamauchi et al. | ............. | 165/145 |
| 6,328,100 B1 * | 12/2001 | Haussmann | ................... | 165/176 |
| 6,672,080 B2 * | 1/2004 | Tamura | ......................... | 165/145 |
| 6,688,292 B2 * | 2/2004 | Ruppel et al. | ................... | 60/599 |
| 7,293,604 B2 * | 11/2007 | Sasaki et al. | .................. | 165/165 |
| 2004/0173343 A1 * | 9/2004 | Starr | .............................. | 165/168 |
| 2005/0109483 A1 * | 5/2005 | Kolb | ................................ | 165/41 |
| 2005/0161206 A1 | 7/2005 | Ambros et al. | | |
| 2008/0169092 A1 * | 7/2008 | Kardos | .......................... | 60/599 |

FOREIGN PATENT DOCUMENTS

| | | | | |
|---|---|---|---|---|
| GB | 2375388 A * | 11/2002 | ...................... | 60/599 |
| NL | 1027948 C | 7/2006 | | |
| NL | 1027948 C2 * | 7/2006 | ...................... | 60/599 |

* cited by examiner

*Primary Examiner* — Mary A Davis

(57) ABSTRACT

The arrangement of a charge air cooler in an intake system of an internal combustion engine has a charge air cooler that on the one hand is supplied with combustion air and on the other hand with a liquid coolant. A coolant/air cooler is provided in which the liquid coolant is cooled by an air stream. The charge air cooler is slantedly arranged in a pipe conduit for the charge air with regard to the end face of a heat exchanger block exposed to the charge air. The end face of the charge air cooler is arranged relative to the cross-section of the pipe conduit at an angle of >45°.

2 Claims, 3 Drawing Sheets

ARRANGEMENT OF A CHARGE AIR COOLER IN AN INTAKE SYSTEM OF AN INTERNAL COMBUSTION ENGINE

BACKGROUND OF THE INVENTION

1. Technical Field

The invention concerns the arrangement of a charge air cooler in an intake system of an internal combustion engine, comprising a charger for the combustion air.

2. Prior Art

In charged internal combustion engines a charge air cooler is often required for cooling the compressed air. For direct charge air cooling, the charge air is cooled by a charge air/air heat exchanger by the air flow caused by driving. For indirect charge air cooling, the charge air is cooled by a charge air/coolant heat exchanger. The coolant itself is cooled by a coolant/air heat exchanger by the air flow caused by driving, optionally with assistance of a fan. Such coolant/air heat exchangers are known in various embodiments.

In NL-C-1027948 a charge air cooler is disclosed that is supplied on the one hand with air supplied to the cylinders of the internal combustion engine and on the other hand with a coolant. In this connection, a housing is installed in the charge air conduit in which housing one or two heat exchangers are arranged in an upright position wherein, in the case of two heat exchangers, they are arranged with regard to the end faces in a V-shape relative to one another. These embodiments require a significant amount of space because the housings and the heat exchangers, compared to the cross-section of the charge air conduit, are significantly larger.

DE 103 59 806 A1 discloses a heat exchanger that is usable as an exhaust gas heat exchanger or a charge air cooler. As a coolant for cooling the charge air a cooling liquid is provided. The heat exchanger is comprised of a stack of flat heat exchanger pipes wherein the ends of the pipes are received in collecting tanks, respectively, to which tanks the charge air conduit is connected. The charge air passes through the heat exchanger pipes in their longitudinal direction and between the flat pipes flow channels are formed through which the cooling liquid flows. Such a configuration of the heat exchanger takes into consideration the enormous temperature changes in particular in case of exhaust gas heat exchangers but it also causes a great manufacturing expenditure.

The invention has the object to provide an arrangement of a charge air cooler of the aforementioned kind such that it can be produced with simple means and has a small size.

This object is solved by an arrangement of a charge air cooler that is slantedly arranged in the pipe conduit for the charge air with regard to the end face of the heat exchanger block that is loaded with charge air, wherein the end face of the charge air cooler relative to the cross-section of the pipe conduit is arranged at an angle of >45°.

SUMMARY OF THE INVENTION

The slanted installation of a charge air cooler according to the present invention has the advantage that the charge air cooler can be installed in a pipe conduit of the intake system without this requiring an additional housing for the charge air cooler. The slant angle of >45° relative to the line of the cross-section through the pipe causes only a minimal resulting height of the heat exchanger block while at the same time a large end face exposed to charge air is provided.

According to a preferred embodiment of the invention the charge air cooler is provided with at least one collecting tank for the coolant wherein the collecting tank or the collecting tanks are arranged outside of the pipe conduit. In this way, only the heat exchanger block is within the cross-section that is loaded with the charge air flow so that the collecting tanks do not present a flow resistance to the charge air.

Preferably, the pipe conduit has sections at the inlet and outlet sides of the charge air cooler whose cross-section substantially matches the surface that results from the height of the charge air cooler that is the result of the angle about which the charge air cooler is slanted and the width of the heat exchanger block orthogonal to the air flow direction. In this way, the cross-section that is available for the charge air remains substantially constant within the entire pipe conduit.

It can also be expedient to provide the charge air cooler with two collecting tanks that each comprise a bottom facing the heat exchanger block, respectively, wherein this bottom is matched to the contour of the pipe conduit. In this way, a special shaping of the sections of the pipe conduit for an air-tight connection to the edge of the heat exchanger block is not required. Expediently, the pipe conduit, with respect to the sections before and behind the charge air cooler, is at least of a two-part configuration and the charge air cooler is mounted in such a way between these sections that the edges of the heat exchanger block are sealed relative to the pipe conduit. Alternatively, it is however also possible that the pipe conduit relative to the sections is of a unitary construction and has an opening through which the charge air cooler can be inserted into the pipe conduit.

In regard to the configuration of the charge air cooler, it is possible that the charge air cooler has at a common end of the heat exchanger block both collecting tanks for intake and return of the coolant; at the other end means for deflecting the coolant are provided. For various reasons, it can be expedient to design the charge air cooler to comprise several heat exchanger blocks that have a smaller depth than the arrangement as a whole, wherein the exchanger blocks are connected by the collecting tanks provided at the ends. In such a case, the heat exchanger blocks are arranged in immediate contact with one another in the flow direction of the charge air.

For a simple configuration of the charge air cooler it is proposed that the charge air cooler is a pipe/rib heat exchanger wherein the ends of the pipes are seal-tightly mounted in the collecting tanks and the ribs are connected to the exterior of the pipes in a heat-conducting way. Depending on the construction of the heat exchanger, the pipes can have different cross-sections, for example, can be designed as a flat pipe, a round pipe, or an oval pipe. With regard to the collecting tanks, it is possible to make the pipe bottom from metal and to configure the collecting tank lid also from metal or plastics.

BRIEF DESCRIPTION OF THE DRAWINGS

Embodiments of the invention will be explained in the following with the aid of the drawing in more detail. The drawing shows in.

EMBODIMENT(S) OF THE INVENTION

Figure 1:
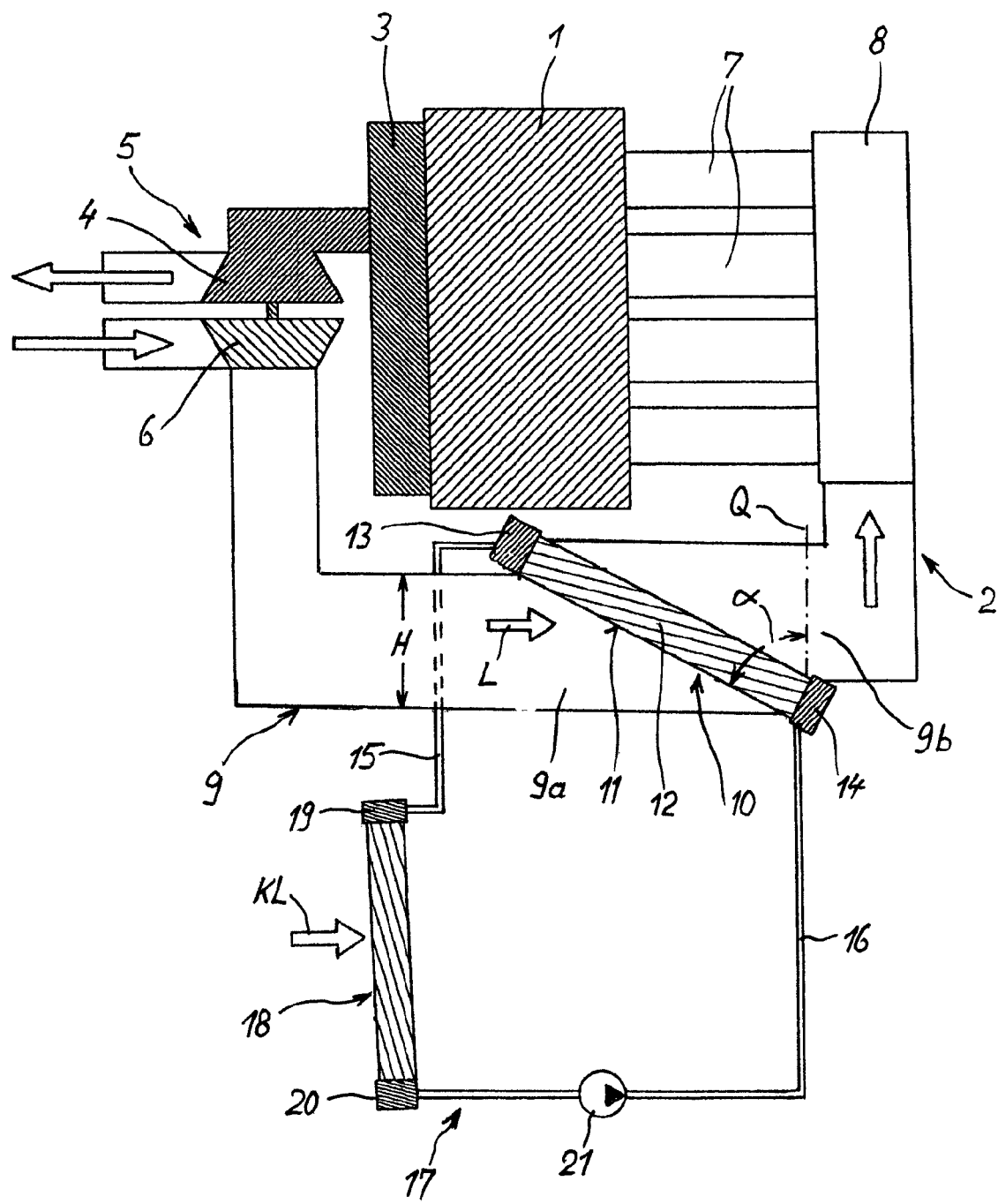
FIG. 1 a schematic illustration of an internal combustion engine with turbocharger and an arrangement of a charge air cooler in an intake system.

FIG. 1 shows an internal combustion engine 1 with an intake system 2 and an exhaust gas manifold 3. A turbine 4 of an exhaust gas turbocharger 5 is connected to the exhaust gas manifold 3 and the intake system is connected to the compressor 6. The intake system 2 comprises several intake pipes 7 that extend from the intake conduit 8 to the internal combustion engine 1. Between the compressor 6 and the intake conduit 8 the intake system 2 also comprises a pipe conduit 9 that is comprised of sections 9a and 9b. In the pipe conduit 9 between the sections 9a and 9b a charge air cooler 10 is arranged that, relative to a cross-section Q of the pipe conduit 9, is positioned at a slant within the pipe conduit 9. An end face 11 of the charge air cooler 10 is positioned relative to the cross-section Q at an angle of >45°. In the embodiment the angle α is approximately 60°.

The charger air cooler 10 is slanted such within the pipe conduit 9 that the top edge of the end face 11 of a heat exchanger block 12 adjoins the upper edge of the pipe conduit section 9a and the bottom edge of the end face 11 adjoins the lower edge. In this way, the heat exchanger block 12 of the charge air cooler 10 has a height H that corresponds to the inner height of the pipe conduit 9. On opposite ends of the heat exchanger block 12 the charge air cooler 10 is provided with collecting tanks 13, 14 where the ends of pipes of the heat exchanger block 12 open. Lines 15, 16 of a cooling circuit 17 are connected to the collecting tanks 13, 14 in which a liquid coolant flows. The lines 15, 16 are connected to a coolant/air cooler 18, i.e., its collecting tanks 19, 20. For circulating the coolant a pump 21 is provided that is arranged in the line 16 in the illustrated embodiment.

In operation of the internal combustion engine 1 the turbine 4 drives the compressor 6 that generates the charge air and the charge air flows according to arrow L through the pipe conduit 9. The pipe conduit 9 has the height H and extends across a width orthogonal to the air flow direction L. Because of the slanted position of the charge air cooler 10, the charge air cooler does not require a large space and requires also no separate housing. Still, the charge air cooler provides a large end face 11 for an effective cooling action of the charge air.

The charge air cooler can be designed in a simple way as a pipe/rib heat exchanger wherein the ribs are attached externally on the pipes by a connection providing excellent heat conduction. The heat removed from the charge air is absorbed by the coolant flowing through the pipes and the coolant is supplied through line 15 to the coolant/air cooler 18. On the one hand, coolant flows through the coolant/air cooler 18 and on the other hand a cooling air stream KL flows through it, for example, the air stream generated by driving. For generating a coolant air flow that always suffices, a fan can be correlated with the coolant/air cooler 18. The pump 21 takes in coolant cooled in the cooler and conveys it to the collecting tank 14 of the charge air cooler 10.

Figure 2:
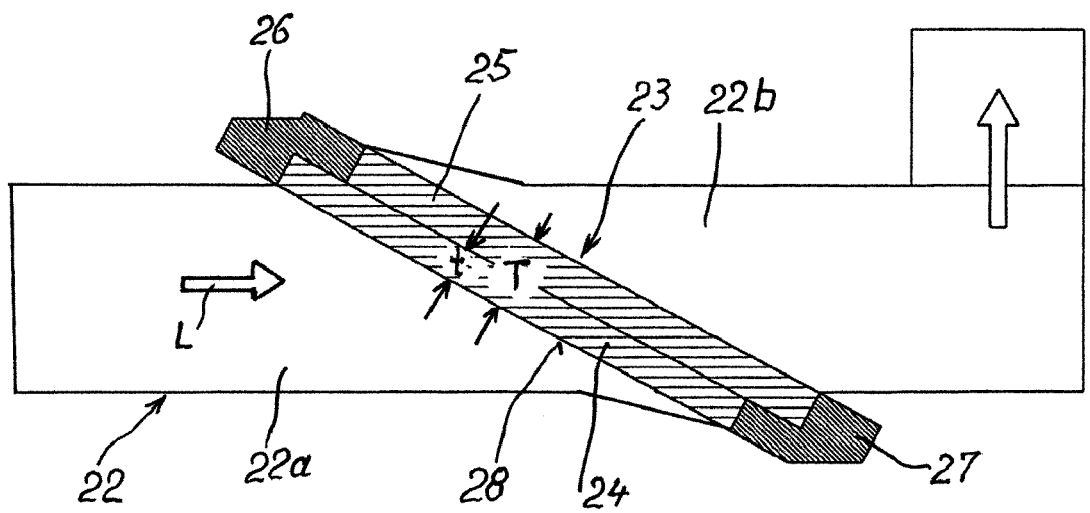
FIG. 2 a pipe conduit of the intake system with an embodiment of the charge air cooler.

In FIG. 2, a pipe conduit 22 of the intake system is illustrated that is comprised of a pipe conduit sections 22a, 22b between which a charge air cooler 23 is arranged. The charge air cooler 23 comprises two heat exchanger blocks 24, which in the flow direction of the charge air contact one another directly. The pipe ends of the heat exchanger pipes are received in the collecting tanks 26, 27. The respective pipe bottoms are arranged in a staggered arrangement relative to one another in order to better match the arrangement of the two heat exchanger blocks 24, 25 as a whole to the cross-sectional shape of the pipe conduit 22. The individual heat exchanger blocks have a depth t based on which the depth T for the arrangement as a whole results. Lines for the liquid coolant are connected to the collecting tanks 20, 27 as illustrated in FIG. 1. The reference numeral 28 indicates the end face of the heat exchanger block 24 that is exposed to the charge air. FIG. 2 also shows that the collecting tanks 26, 27 are arranged outside of the inner cross-section of the pipe conduit 22 that conveys the charge air. Depending on the required efficiency of the charge air cooler, more than two heat exchanger blocks can be combined.

Figure 3:
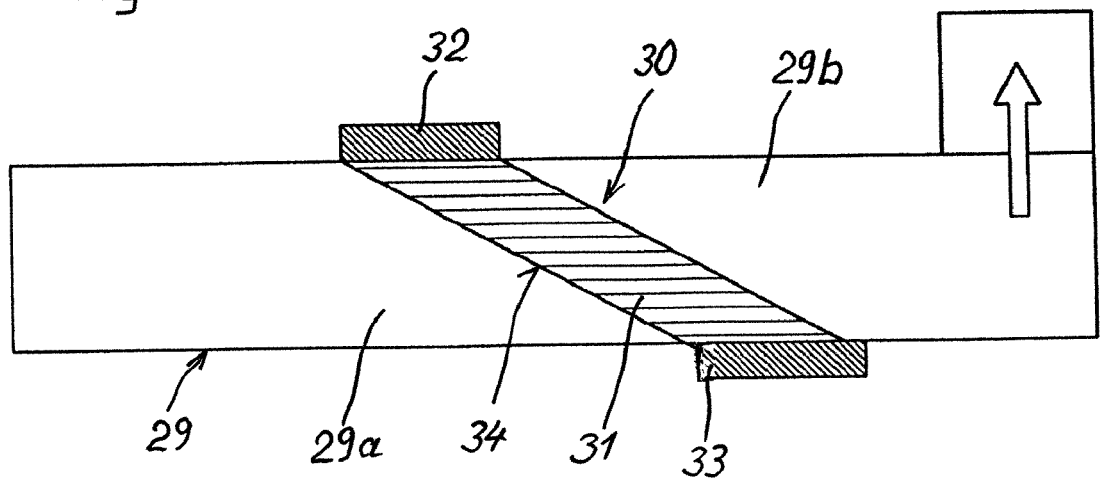
FIG. 3 a modified embodiment of FIG. 2.

In FIG. 3 a modified embodiment of a pipe conduit 39 comprised of sections 29a, 29b with a charge air cooler 30 comprising heat exchanger block 31 and collecting tanks 32, 33 for the liquid coolant is illustrated. The heat exchanger block 31 has in the illustration of FIG. 3 the shape of a parallelogram wherein the upper and lower sides of the heat exchanger block 31 define a height H of the charge air cooler 30 that corresponds to the height H of the pipe conduit 29. The collecting tanks 32, 33 arranged at the upper and lower ends of the heat exchanger block 31 are matched to the contour of the pipe conduit sections 29a, 29b and are located outside thereof. Such a configuration of the charger air cooler 30 makes it possible that the pipe conduit 29 has a completely straight extension and no adjustments to the shape or position of the heat exchanger block is required. The reference numeral 34 indicates the end face of the heat exchanger block 31. Lines for the liquid coolant are connected to the collecting tanks 32, 33 as illustrated in FIG. 1.

Figure 4:
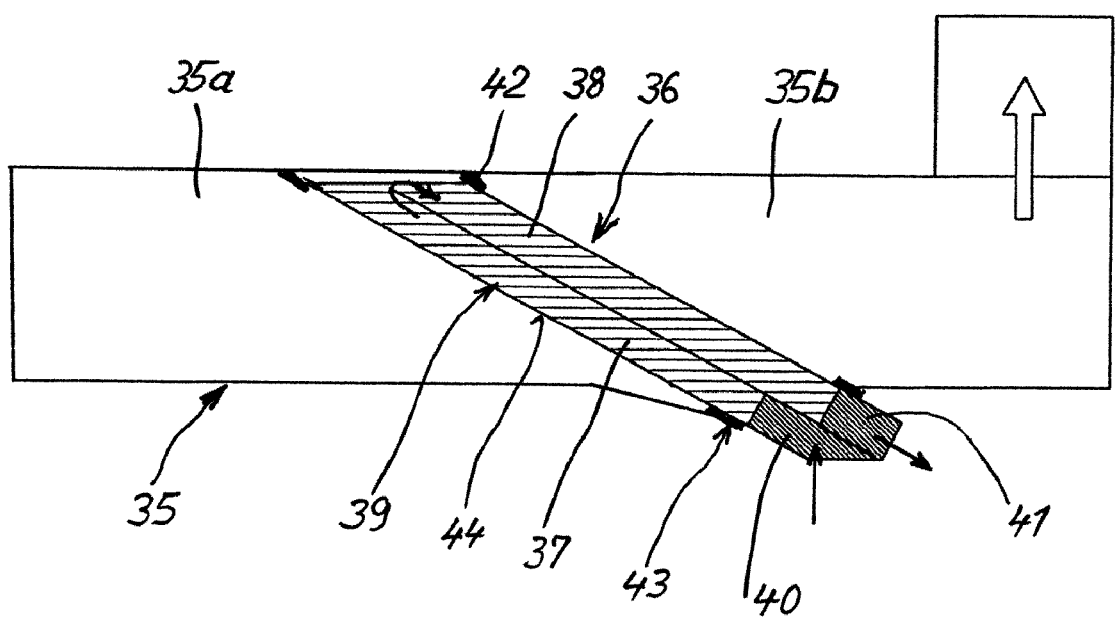
FIG. 4 a further modified embodiment of FIG. 2.

FIG. 4 shows a modified embodiment of a pipe conduit 35 comprised of sections 35a, 35b with a charge air cooler 36 that has two sections 37, 38 of a heat exchanger block 39. At one end of the heat exchanger block 39 two collecting tanks 40, 41 are provided in which the ends of the heat exchanger pipes are received. The other end of the heat exchanger block 39 is provided with an inner deflection means for liquid coolant, i.e., the coolant flows first through the section 37 and is deflected at the other end into the section 38 and flows through it to the collecting tank 41. Such a charge air cooler 36 can be inserted in a simple way into the pipe conduit 35 in that the heat exchanger block 39 is inserted through an opening 43 provided in the pipe conduit 35 into the pipe section. For safely securing the free end of the heat exchanger block 39 on the opposite wall of the pipe conduit 35 a holder 42 is provided into which the end of the heat exchanger block 39 is inserted. The charge air cooler 36 has an end face 44 and the collecting tanks 40, 41 are connected to the lines for the cooling liquid as shown in FIG. 1.

What is claimed is:

1. An arrangement of a charge air cooler in an intake system of an internal combustion engine comprising a charger for the combustion air, the arrangement comprising:

a charge air cooler supplied with combustion air and with a liquid coolant;

a coolant/air cooler in which the liquid coolant is cooled by an air flow;

a pipe conduit for the charge air;

wherein the charge air cooler is slantedly arranged in the pipe conduit so that an end face of a heat exchanger block of the charge air cooler which end face is facing a flow of the charge air in the pipe conduit is arranged at an angle of >45 degrees relative to a cross-section of the pipe conduit, wherein the charge air cooler has at least one collecting tank for the liquid coolant and the at least one collecting tank is arranged outside of the pipe conduit, wherein the pipe conduit is of a one-piece, unitary, monolithic configuration in which said unitary pipe conduit includes inlet and outlet sides in a single unitary one piece component, said unitary pipe conduit having a sidewall opening arranged between said inlet and outlet sides through which the charge air cooler is inserted into the unitary, one-piece pipe conduit, wherein the charge air cooler has two of the at least one collecting tank arranged at a first end of the heat exchanger block, wherein said two collecting tanks are provided for supplying and returning the liquid coolant and wherein at a second end of the heat exchanger block defecting means are provided that deflect the liquid coolant.

2. An arrangement of a charge air cooler in an intake system of an internal combustion engine comprising a charger for the combustion air, the arrangement comprising:

a charge air cooler supplied with combustion air and with a liquid coolant;

a coolant/air cooler in which the liquid coolant is cooled by an air flow;

a pipe conduit for the charge air;

wherein the charge air cooler is slantedly arranged in the pipe conduit so that an end face of a heat exchanger block of the charge air cooler which end face is facing a flow of the charge air in the pipe conduit is arranged at an angle of >45 degrees relative to a cross-section of the pipe conduit, wherein the pipe conduit is a one-piece, unitary, monolithic configuration in which said unitary pipe conduit includes inlet and outlet sides in a single unitary one piece component, said unitary pipe conduit having a sidewall opening arranged between said inlet and outlet sides through which the charge air cooler is inserted into the unitary, one-piece pipe conduit, wherein the charge air cooler has at least one collecting tank for the liquid coolant and the at least one collecting tank is arranged outside of the pipe conduit, wherein the charge air cooler comprises two heat exchanger blocks each having a first depth, wherein the heat exchanger blocks in the direction of flow of the charge air are resting against one another so that the charge air cooler has a second depth that is twice the first depth, wherein the two heat exchanger blocks are connected to one another by the at least one collecting tank arranged terminally at the two heat exchanger blocks.

* * * * *